United States Patent [19]

Kimura

[11] 4,442,634
[45] Apr. 17, 1984

[54] RETAINER DEVICE FOR CAR WIND-UP WINDOW

[75] Inventor: Shigeru Kimura, Kamakura, Japan

[73] Assignee: Nifco Inc., Yokohama, Japan

[21] Appl. No.: 482,354

[22] Filed: Apr. 5, 1983

[30] Foreign Application Priority Data

Apr. 6, 1982 [JP] Japan .................. 57-48812[U]

[51] Int. Cl.³ ............................................. E06B 7/16
[52] U.S. Cl. ........................................ 49/493; 49/377; 49/502
[58] Field of Search ............... 49/502, 440, 441, 415, 49/416, 377, 493

[56] References Cited

U.S. PATENT DOCUMENTS

| | | | |
|---|---|---|---|
| 2,078,973 | 5/1937 | Reid | 49/440 |
| 2,913,783 | 11/1959 | Bright | 49/377 X |
| 3,354,584 | 11/1967 | Parsons | 49/377 |
| 3,742,649 | 7/1973 | Dochnahl | 49/441 |
| 3,908,312 | 9/1975 | Pennec | 49/493 |

Primary Examiner—Philip C. Kannan
Attorney, Agent, or Firm—J. R. Halvorsen; T. W. Buckman

[57] ABSTRACT

A retainer device for the glass of a car window has a baseplate provided at one side with means to allow the attachment of the baseplate to the window frame of the car, and at the other side with an upright member in which there is an opening. Inside this opening there is a support member, on which is placed a piece of fabric, on which there is an area of flock. When the device is affixed to the edge of the window frame, with the waist molding held in position, the flock area of the fabric is pressed into contact with the window-glass by the support member, thereby keeping the glass steady.

3 Claims, 6 Drawing Figures

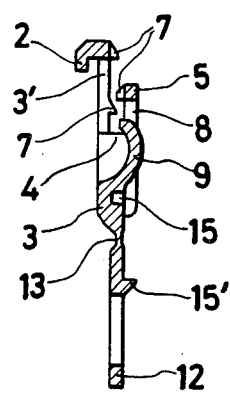
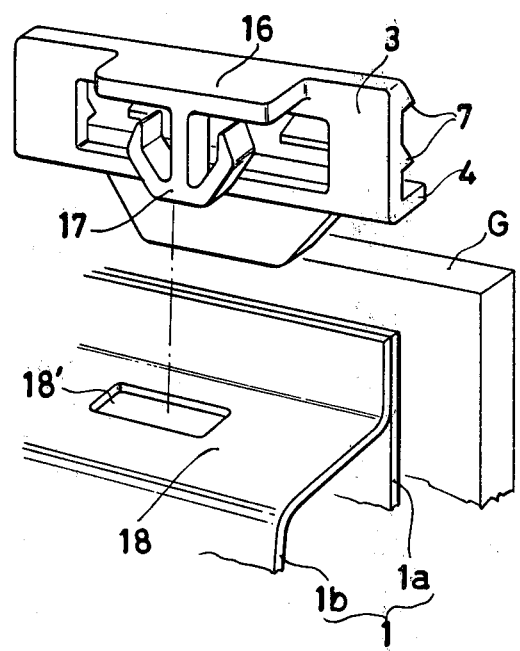
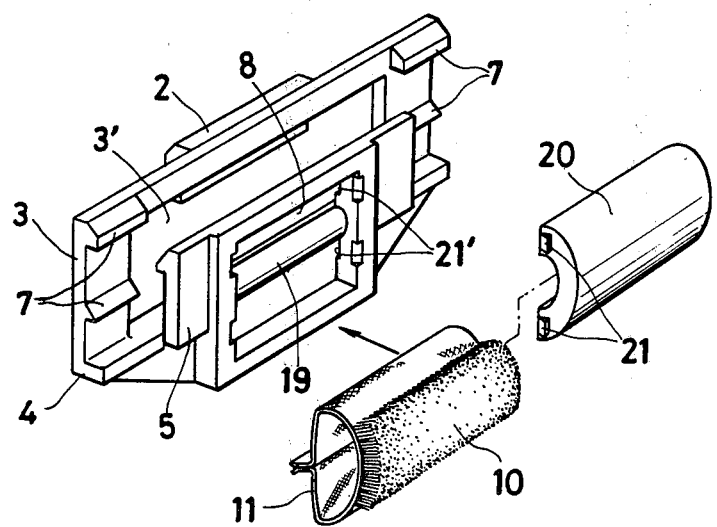

RETAINER DEVICE FOR CAR WIND-UP WINDOW

BACKGROUND OF THE INVENTION

This invention relates to a retaining device, made of plastic, which is set inside an automobile door in sliding contact with the outer surface of the glass of a wind-up type window, thereby urging the glass towards the interior of the automobile.

In order to provide a car window which is raised and lowered to close and open it with stability in the closed state and in the open state, the waist molding (hereinafter referred to simply as "molding") has been provided with brackets on which are mounted rubber rolls which can rotate freely; also, fabric provided with teflon flock was woven into cylindrical form, and into this was passed a metal member, on one side of which sponge had been stuck, the metal member being attached so that the sponge gave support from the rear to the block side of the fabric. The rubber rolls and the teflon flocked fabric were both faced towards the inner panel in sliding contact with the window-glass as it moved up and down. However, use of the rubber rolls involved problems such as scratches to the glass and rubbing noises produced by the movement of the window, while the teflon flock fabric also involved problems, such as uneconomical use of materials and increases in the number of processes required, extending to the adhesion of the sponge backing, the provision of flock even on portions not in contact with the glass, and so forth. Furthermore, when after long use the rubber rolls, or the flock, became worn, replacing them was difficult.

SUMMARY OF THE INVENTION

The object of this invention is to provide a retainer for window glass in a car door which effectively and stably steadies the glss of an automobile window so that when the window is moved up or down to open or close it no unpleasant rubbing sounds are produced, nor is the glass scratched, while at the same time it also has a molding support function, is easy to fit and is economical.

A car door window-glass retainer to achieve this object consists of a baseplate provided with fixing means as its top front edge portion and a lip on its rear surface; an upright member having in its central portion an opening, provided at the edge of the lip of the baseplate; a support member in the opening which has an outwardly curving surface; and a fabric portion provided with a flock area stretched over the outwardly curving surface of the support member.

The molding is inserted into position between the baseplate and the upright, and attachement is effected by the insertion and engagement in a fixing hole provided in the rim portion of the window frame of a retainer device fixing means such as a clip anchor. The fabric stretched over the curved surface of the support member is protruded from the opening in the upright to press against the glass of an automobile window to retain the glass in a stable condition. The upright may be fixed integrally relative to the baseplate or it may be fixed removably. As the fabric is removable it is easy to replace when its efficiency deteriorates after long use. The retainer device according to this invention is simple to attach and efficiently stabilizes the window-glass without damaging the glass or producing any rubbing noises as the glass moves up or down.

Other objects and features of the invention will become clear from the following description provided in conjunction with the drawings.

BRIEF EXPLANATION OF THE DRAWINGS

FIG. 4 is a cross-sectional view along the line IV—IV of FIG. 3;

FIG. 5 is an oblique view of a second embodiment of the invention; and

FIG. 6 is an oblique view also of another embodiment, shown in a disassembled state.

DESCRIPTION OF THE PREFERRED EMBODIMENTS

Figure 1:
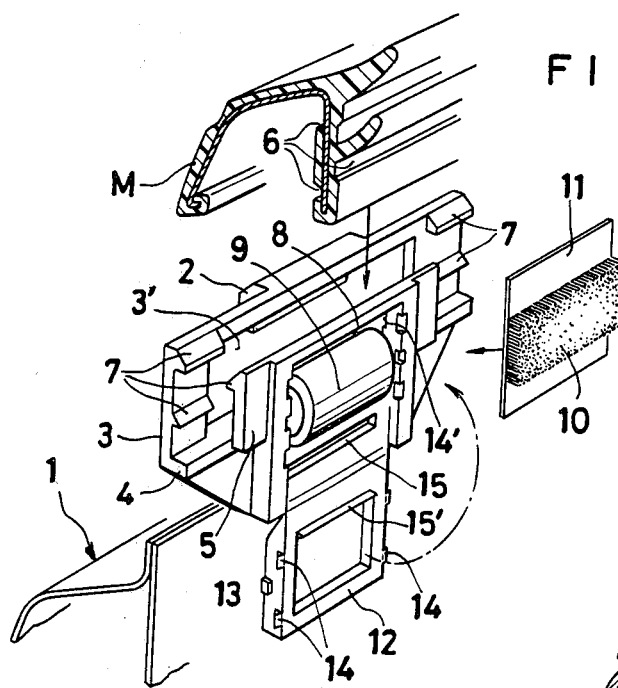
FIG. 1 is an oblique view showing the overall arrngement of a first embodiment of the invention.
Figure 2:
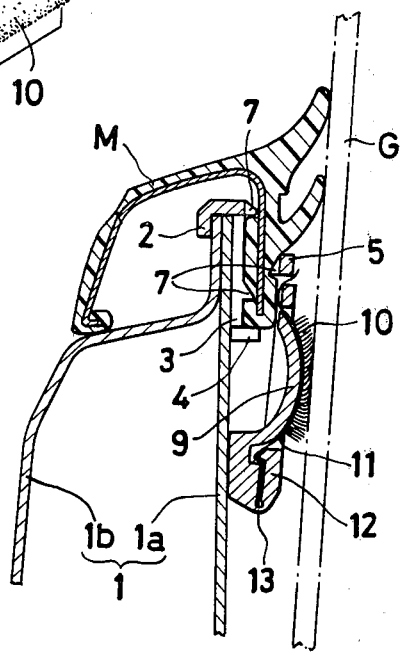
FIG. 2 is a transverse cross-sectional view of the above embodiment in an affixed condition.
Figure 3:
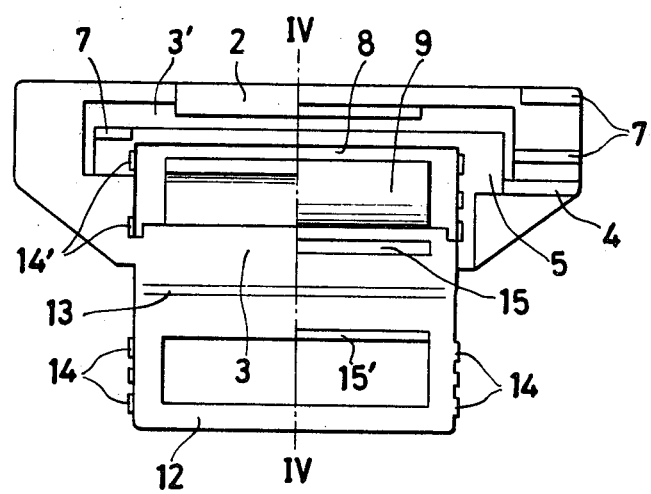
FIG. 3 is a front view of the baseplate of the above embodiment, one hlf being as seen from the front and the other half as seen from the rear.

A first embodiment of the retaining device for the glass of automobile wind-up windows according to this invention will be described with reference to drawings 1 to 4. At the lower edge of a window an outer panel 1 is held by a hook 2 which is provided on the upper outer edge of a baseplate 3 depending therefrom in surface contact with the inner panel 1a of the outer panel 1. The baseplate 3 has an inward facing lip portion 4 on the line of demarcation of the baseplate into an upper portion and a lower portion. There is a low upright member 5 provided integrally in opposition to the upper half of the baseplate 3 so that sufficient space is maintained therebetween to permit the insertion of the inner base portion of a molding M, while ridge portions 7 are provided on one or both of the opposed surfaces to engage with corresponding engagement portions 6 on the said inner base portion of the molding M.

Mid-way up the height of the baseplate is a rectangular opening 8 formed in part by the upright member S'. In this opening 8 is affixed a piece of fabric which has a flock portion, as will be described hereinbelow.

For this, in the present embodiment, there is inserted up into the opening 8 a support member 9 which is narrower than the opening and is curved to protrude inwardly. The upper edge of the said support member 9 is separated from the upper edge of the opening 8, and the upper rear edge is set forward away from the rear side of the baseplate, and the sides of the support member 9 are separated from the sides of the opening.

The support member 9 supports on the outer, curved surface thereof the fabric 11 on which is the flock portion 10, and functions to urge the said flock portion 10 into sliding contact with the moving window glass G. The width of the fabric 11 may be about the same as the width of the support member 9 and in length can be made longer than the outer surface thereof, with the brush portion 10 forming a band across the center of the support member.

12 is clamp-frame into which the support member fits to hold the fabric 11 in place. In the process of plastic-forming the device of the present embodiment the clamp-frame 12 is integrally connected with the baseplate 1 by means of a hinge 13, so that when the clamp-frame is swung up into place, it frames the support member 9 which is in the opening 8 and separated at the sides and top and bottom therefrom, clamping the fabric extending below the support member against the lower part of the baseplate.

To keep the clamp-frame fixed in the clamped state small projections 14 are provided on each side of the clamp-frame which snap into insets 14' formed in each side of the opening 8. Moreover, by providing at the lower inner edge of the baseplate a groove 15 which is wide enough to permit insertion of the entire width of the lower part of the fabric 11, and in the lower part of the clamp-frame 12 a matching strip 15' which fits into the groove 15, the fabric can be clamped into groove 15 by strip 15' in addition to being clamped between the lower part of the clamp-frame and the lower edge of the baseplate, while at the same time when the clamp-frame is lifted into place around the support member 9 and fixed there by the projections 14 and the insets 14', the fabric 11 can be pulled upwards to stretch it tightly over the surface of the support member. When the fabric 11 is thus affixed the flock portion 10 on the surface thereof will of course protrude further inwards than the lip 4 or the upright member 5.

In accordance with a known method molding clips are affixed at intervals in the outer panel along the lower edge of the window and molding M is fastened down over the lower edge of the window by means of these clips. Therefore if the retainer device according to the present invention is hung from the lower edge of the window between these molding clips by means of the hook 2, the base of the inner part of the molding can be inserted into the space between the upper half of the baseplate and the upright member 5 when the molding is being pressed down to attach it to the molding clips, or the base of the molding can be inserted into the said space prior to the attachment of the molding, each hook 2 being positioned to locate in the spaces between the molding clips when the molding is pressed down onto the window rim.

Thus, no processing is required of either the door paneling or the molding and, moreover, the retainer device can be fitted at the same time the molding is being attached, and, further, the flock can be replaced when worn by opening the clamp-frame 12, removing the fabric and fitting a new piece of fabric and flock, a simple replacement procedure that does not involve the molding in any way. In addition, moreover, to being held by the molding clips the molding is also clamped at its inner base portion between the upper half of the baseplate and the upright member, thereby anchoring the molding more strongly, while as each retainer device is attached not only by its hook but also by its being clamped on the base of the molding which is affixed by means of the molding clips, the retainer itself is stably secured and affixed more strongly to the door panel.

While in the present embodiment the clamp-frame 12 is formed integrally with the baseplate 3 by means of a hinge portion, it may be formed separately and pressed into place to fix it around the support member.

In the embodiment as shown in FIG. 5 the baseplate has no hook on its top and is instead provided with a lip portion 16 and an anchor type fastener, or other known fastening means, integrally provided on the underside of the lip portion for press-fixing into a hole 18' in the stepped portion 18 extending along the lower edge of the window, in an outer panel 1b.

FIG. 6 shows another embodiment of the device according to the present invention. The principal difference with the first embodiment lies in the method of attaching the fabric, as in this embodiment the fabric forms a cylinder; as this is the main difference, parts which are identical in construction to parts in the first embodiment have been given the same symbols and their description omitted.

Instead of the support member 9 of the first embodiment protruding up into opening 8 there is integrally provided in the opening 8 a transverse bar 19. Formed separately to this transverse bar is a support member 20. The surface of the said support member 20 which faces the transverse bar has a rounded groove for fitting over the bar, while its opposite surface is arched into an outward curve, so in cross-section the support member is roughly "C" shaped. The support member is inserted into the cylindrical fabric and fitted over the transverse bar. Each side of the opening 8 is provided with small snap-in indentations 21' while the support member 20 is provided at each end with corresponding projections for snapping into engagement in the said indentations 21' to thus hold the support member in position on the transverse bar.

The circumferential length of the fabric 11 should be such that it is stretched taut when the support member is fixed in place on the transverse bar, and the flock portion 10 just enough for the supporting outward curve of the support member.

The same effects as in the other embodiments described above may also be obtained in this embodiment by providing the baseplate 2 with a hook 2 at its upper, outer edge, or a lip portion and a snap-in anchoring member for attachment to the door panel.

In all of these embodiments it is preferable to form an opening 3' in the upper half of the baseplate, leaving a lip portion having a downward-pointing clip-in anchor, an upper edge provided with fastening means such as a hook, and ridge portions 7 at both sides, so as to economize on the amount of plastic required used for the device and reduce the costs involved.

What is claimed is:

1. A retainer device for the glass of an automobile window which consists of a baseplate provided at the upper part of its outer surface with a fixing means and at its inner surface with an inward facing lip portion; an upright member at the inner edge of the lip portion in opposition to the baseplate to clamp a waist molding therebetween, said upright member being provided in its central portion with an opening; a support member with an outwardly curved surface which is located in the said opening of the upright member; and a fabric portion provided on its surface with a flock portion and replaceably set on the outer surface of the said support member; the said retainer device being attached so as to urge the said flock portion against the outer surface of the glass of a vertically openable window.

2. A retainer device according to claim 1 in which a clamp-frame is attached to the lower edge of the baseplate by means of a thin hinge portion, so that the said clamp-frame can be hinged into position around the support member to hold the said fabric portion in place.

3. A retainer device according to claim 1 in which the support member has been formed separately and has a "C" shaped cross-section, the fabric portion is in the shape of a cylinder for the insertion therein of the said support member, the sid support member being fitted in place within the said opening in the upright member.

* * * * *